Aug. 7, 1945.   W. COULSON   2,381,488
ROTARY SPINDLE DRIVE
Filed April 1, 1942   3 Sheets-Sheet 1

Inventor.
Walter Coulson
By:-
Parker, Carlson, Pitzner + Hubbard
Atty's.

Aug. 7, 1945. W. COULSON 2,381,488
ROTARY SPINDLE DRIVE
Filed April 1, 1942 3 Sheets-Sheet 2
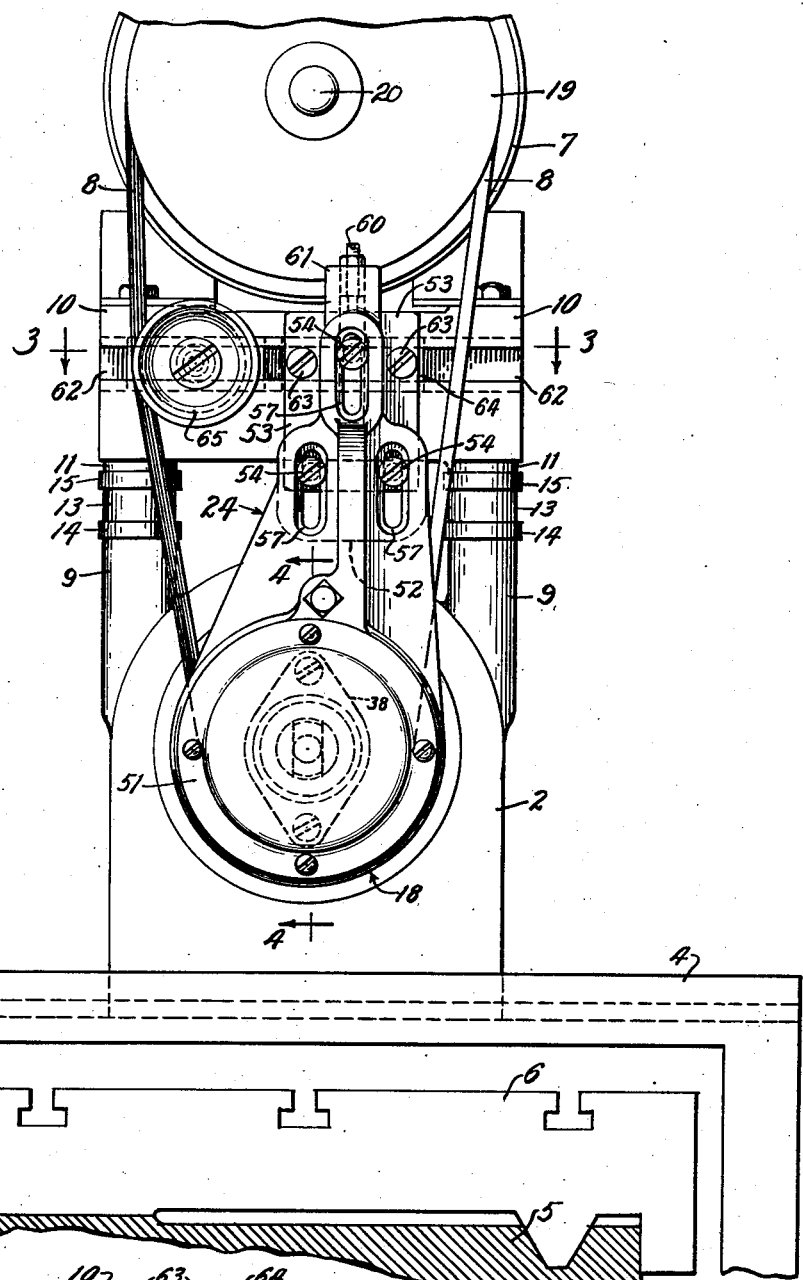
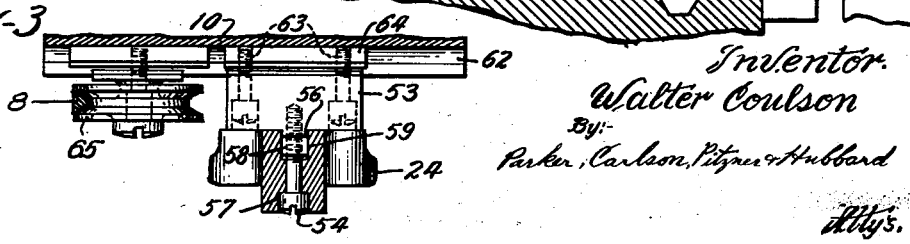
Inventor
Walter Coulson
By:-
Parker, Carlson, Pitzner & Hubbard
Attys.

Aug. 7, 1945.  W. COULSON  2,381,488
ROTARY SPINDLE DRIVE
Filed April 1, 1942  3 Sheets-Sheet 3

Inventor
Walter Coulson
By:—
Parker, Carlson, Pitzner & Hubbard
Attys.

Patented Aug. 7, 1945

2,381,488

UNITED STATES PATENT OFFICE 2,381,488

ROTARY SPINDLE DRIVE

Walter Coulson, Detroit, Mich., assignor to Ex-Cell-O Corporation, Detroit, Mich., a corporation of Michigan Application April 1, 1942, Serial No. 437,205

6 Claims. (Cl. 74—216.5)

The present invention relates to a rotary spindle drive, and has particular reference to an indirect drive in which the motor may be disposed over the spindle and connected thereto through a belt.

One of the objects of the invention is to provide a novel spindle drive of the foregoing character having means for absorbing vibrations in the mounting for the drive motor and in the drive connection to the spindle, so that vibrations are not transmitted to the spindle with deleterious effect upon the surface finish produced, for example, in a metal boring operation.

Another object is to provide a new and improved spindle drive which is adjustable to accommodate different speed ratios and which may be readily assembled and disassembled.

Further objects and advantages will become apparent as the description proceeds.

In the accompanying drawings,

Fig. 2 is an end elevational view.

Fig. 3 is a detail plan view, in section along line 3—3 of Fig. 2.

Figure 1:
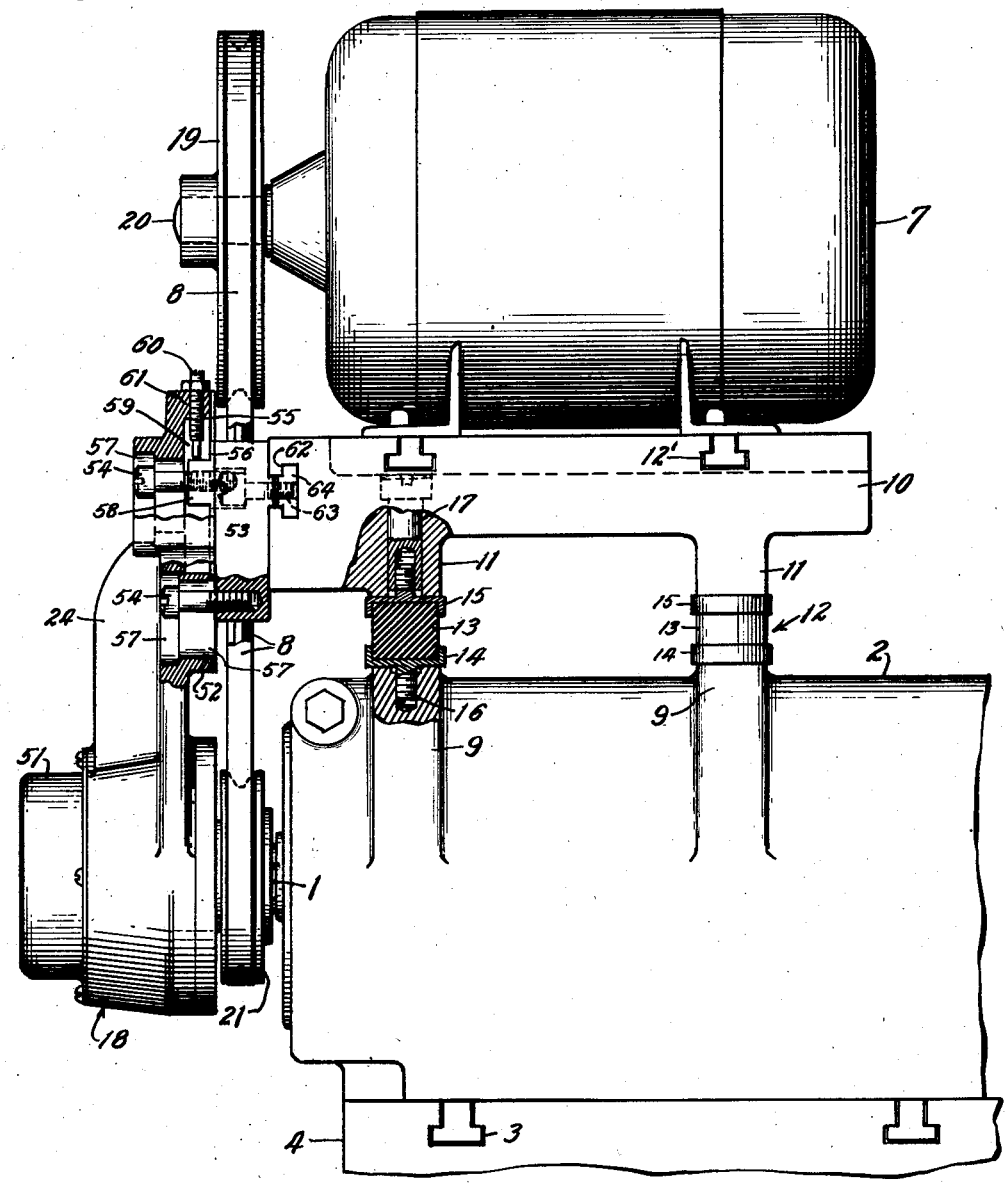
Figure 1 is a side elevational view of a spindle and drive assembly embodying the features of my invention.
Figure 4:
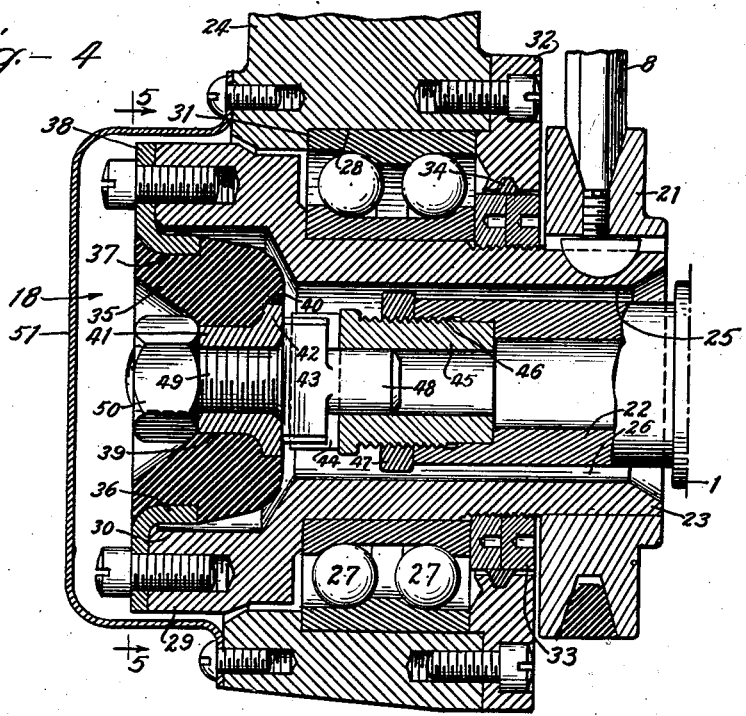
Fig. 4 is a fragmentary vertical sectional view taken substantially along line 4—4 of Fig. 2.
Figure 5:
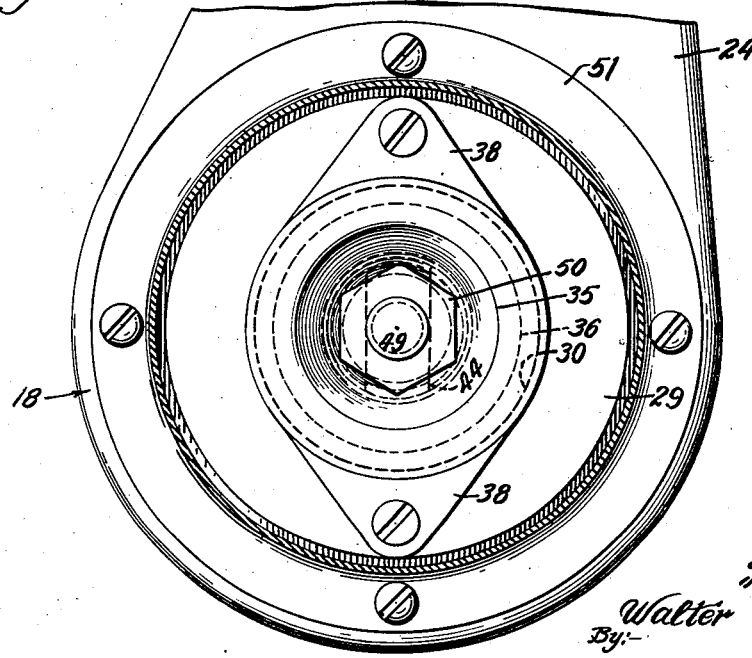
Fig. 5 is a fragmentary vertical sectional view taken substantially along line 5—5 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the drive is not limited to any particular type of spindle, but is particularly advantageous when used for tool spindles in precision boring machines such as disclosed in Alden Patent No. 2,000,553.

In the exemplary embodiment of the invention, the spindle 1 is journaled in a suitable bracket 2 mounted for lateral adjustment along T-slots 3 on a stationary bridge member 4 in turn supported on and spanning the top of a machine base 5. A carriage or table 6 is reciprocable on the base 5 longitudinally of the spindle 1 and extends at one end underneath the bridge member 4. In a boring machine, the work (not shown) ordinarily would be mounted on the table 6 and a suitable boring tool (not shown) in such event would be mounted in the operative end of the spindle 1.

The spindle 1 is normally driven at the desired speed from an electric motor 7 through a belt 8. In certain machines, it is desirable to support the drive motor 7 over the spindle 1 on a suitable fixed support on the bridge member 4, such for example as the spindle bracket 2 itself. In the present instance, the bracket 2 is formed on the top at opposite sides with four rectangularly arranged upstanding arms or mounting pads 9. A rectangular horizontal motor base plate 10 is formed on the underside with similar legs or pads 11 adapted to be secured to the pads 9. The drive motor 7 in turn is secured to the top of the base plate 10 for transverse adjustment along suitable T-slots 12'.

If the motor 7 were rigidly connected, either directly or indirectly, through its mounting support to the spindle bracket 2, vibrations set up by the operation of the motor would be transmitted to the spindle 1. These vibrations would tend to affect the quality of the surface finish produced on the work in the boring or machining operation, and would be objectionable where surface finishes of a low micro inch reading are required. Therefore, the motor base plate 10 is secured to the spindle bracket 2 through suitable resilient or cushion connecters 12 to absorb the motor vibrations, and thereby to prevent the vibrations from being transmitted to the spindle 1 either directly through the spindle bracket 2 or indirectly through the bridge member 4.

Each of the cushion connecters 12 comprises a block or cushion 13 made of any suitable resilient material such as rubber. The rubber block 13 is confined vertically between two opposed flanged metal disks or washers 14 and 15 to which it is permanently secured, as by vulcanizing. The bottom washer 14 has a central stud 16 threaded into the top of the associated pad 9 on the spindle bracket 1. The top washer 15 is rigidly clamped by means of a bolt 17 extending through the base plate 10 to the underside of the opposed leg 11 of the plate.

Vibrations set up by the operation of the motor ordinarily may also be transmitted to the spindle through the drive. Consequently, a resilient torque coupling or cushioning device 18 is interposed in the motor drive at a suitable point. In the present instance, the drive comprises a pulley 19 removably fixed on the motor shaft 20, and connected through the belt 8 to an alined pulley 21 encircling a rear extension shaft 22 on the spindle 1. The spindle pulley 21 is removably keyed to the inner end of a sleeve 23 rotatably supported from the motor base plate 10 in a depending suspension arm or bracket 24, and having an axial bore 25 receiving the extension shaft 22 with sufficient annular clearance 26 to accommodate the independent lateral motion of the arm 24 resulting from the action of the rubber cushioning devices 12 upon motor vibration.

The resilient torque coupling 18 is interposed in the drive connection for the spindle 1 between the sleeve 23 and the spindle extension shaft 22. In the present instance, the sleeve 23 is supported in a radial and end thrust ball bearing 27 confined within a bore 28 opening through the lower end of the suspension arm 24, and is formed on the outer end with an enlarged circular head 29 having a counterbore 30 open to the bore 25. The outer race of the bearing 27 is confined in the bore 28 against a shoulder 31 by means of an annular plate 32 bolted to the inner side of the arm 24. The inner race is confined on the sleeve 23 against the head 29 by means of suitable clamp nuts 33 within the confines of the clamp plate 32. A suitable packing 34 is interposed between the plate 32 and the nuts 33 to seal one side of the bearing 27.

The coupling member 18 comprises an annulus 35 made of any suitable material, such as rubber, and located in freely spaced relation within the counterbore 30. An outer metal ring 36 is permanently secured, as by vulcanizing, in an annular notch 37 formed in the outer periphery of the rubber annulus 35 at the outer end. The ring 36 is formed with two diametrically spaced radial ears or lugs 38 bolted against the outer end face of the enlarged head 29. The rubber element or cushion 35 is formed with an axial bore 39 flared at the outer end and formed in the inner end with an annular notch 40. An internally threaded sleeve 41 is inserted into the inner end of the bore 39, and has an end flange 42 seating in the notch 40. The sleeve 41 is permanently secured to the rubber element 35 as by vulcanizing.

To complete the drive connection to the spindle 1, a diametrical key 43 is attached to the sleeve 41, and engages slidably in a transverse keyway 44 formed in the outer end of a sleeve 45 on the extension shaft 22. The sleeve 45 is threaded into a counterbore 46 in the shaft 22 and is locked against rotation by a nut 47. The drive key 43 is formed on one side with a pilot 48 extending into the bore of the sleeve 45, and on the other side with an axial stud 49 threaded through the sleeve 41 and locked against rotation by a nut 50. A cover plate 51 is bolted to the arm 24 and encloses the torque coupling 18.

The resilient torque coupling serves to transmit the rotary drive from the pulley 21 through the sleeve 23 and the key 43 to the extension shaft 22 of the spindle 1. By reason of the clearance 26 and the resilient character of the rubber annulus 35, lateral movements of the arm 24, due to motor vibration, are permitted without being transmitted to the spindle extension shaft 22. The motor 7 and the drive means, up to the point of connection to the spindle 1, constitute a floating unit from which the spindle is fully cushioned. To assemble the drive, it is merely necessary to bring the key 43 and keyway 44 into interfitting engagement by a relative axial movement, and then to secure the arm 24 to the motor base plate 10.

The bracket arm 24 is adjustable on the motor base plate 10 to effect substantial alinement of the sleeve 23 with the extension shaft 22. To provide for vertical adjustment, the upper end of the arm 24 is formed with a mounting pad 52 slidably disposed on a block 53 and adapted to be clamped thereto by means of suitable bolts 54. The pad 52 is formed with a vertical groove 55 guided on a rib or way 56 on the block 53, and the bolts 54 extend through vertical elongated slots 57 in the arm. A lug 58 on the block 53 extends into a recess 59 in the contacting face of the arm 24, and a vertical adjusting screw 60 extends through a lug 61 at the upper end of the arm 24 for engagement with the lug 58 to locate the arm accurately in vertical position. When so located, the arm 24 is clamped to the block 53 by tightening the bolts 54.

To provide for horizontal adjustment, the block 53 is guided in a T-slot 62 in the side of the motor base plate 10 and is adapted to be secured in position of adjustment by means of bolts 63 engaging suitable nuts 64 in the slot. An idler pulley 65 is also mounted on the motor base plate 10 for adjustment along the T-slot 62 and engages the belt 8 to tension the latter.

The spindle drive thus is adjustable to provide different speed ratios through the substitution of pulleys 19 and 21 on the motor shaft 20 and the sleeve 23. To change the pulley 21, it is merely necessary to remove the arm 24 from the plate 10, thereby affording access to the inner end of the sleeve 23 for the purpose of removing one pulley and substituting another.

I claim as my invention:

1. A rotary spindle drive comprising, in combination, a spindle bracket having a spindle journaled therein, a drive motor having a drive shaft parallel to said spindle and having a base plate attached to the top of said spindle bracket, a plurality of rubber cushioning devices for connecting said base plate to said bracket and operable to absorb motor vibration, a depending arm removably secured to said base plate for adjustment horizontally and vertically crosswise of the spindle axis, a sleeve journaled in the lower end of said arm in substantially coaxial relation to said spindle, alined pulleys removably secured to said drive shaft and said sleeve, an extension shaft on said spindle projecting into one end of said sleeve with an annular clearance to permit independent lateral movement of said sleeve, and a resilient torque coupling secured to the outer end of said sleeve for rotation therewith and having an axially separable key-drive connection with the outer end of said extension shaft.

2. A rotary spindle drive comprising, in combination, a spindle bracket having a spindle journaled therein, a drive motor having a drive shaft parallel to said spindle and having a base plate attached to said spindle bracket, a plurality of rubber cushioning devices for connecting said base plate to said bracket and operable to absorb motor vibration, a depending arm removably secured to said base plate for universal adjustment crosswise of the spindle axis, a sleeve journaled in the lower end of said arm in substantially coaxial relation to said spindle, alined pulleys removably secured to said drive shaft and said sleeve, an extension shaft on said spindle projecting into one end of said sleeve with an annular clearance to permit independent lateral movement of said sleeve, and a resilient torque coupling secured to the outer end of said sleeve for rotation therewith and having a separable connection with the outer end of said extension shaft.

3. A rotary spindle drive comprising, in combination, a spindle bracket having a spindle journaled therein, a drive motor having a drive shaft parallel to said spindle and having a base plate mounted in superimposed relation to said spindle bracket, a plurality of rubber cushioning devices for supporting said base plate to absorb motor vibration, a depending arm secured to said base plate, a sleeve journaled in the lower end of said arm in substantially coaxial relation to said spindle, alined pulleys secured to said motor shaft and said sleeve, an extension shaft on said spindle projecting into one end of said sleeve with an annular clearance to permit independent lateral movement of said sleeve, and a resilient torque coupling connecting said sleeve to said extension shaft, and permitting lateral movement of said sleeve relative to said extension shaft.

4. A rotary spindle drive comprising, in combination, a support, a spindle bracket mounted in fixed relation to said support and having a spindle journaled therein, a drive motor having a drive shaft parallel to said spindle and disposed in superimposed relation to said bracket, resilient cushioning means for supporting said motor and operable to absorb motor vibration and to prevent the transmission of said vibration to said support and said bracket, a depending arm rigidly secured to said motor, a sleeve journaled in the lower end of said arm in substantially coaxial relation to said spindle, alined pulleys removably secured to said drive shaft and said sleeve, and a drive connection including a resilient torque coupling connecting said sleeve to said spindle and operable to prevent the transmission of vibration from said motor to said spindle.

5. A rotary spindle drive comprising, in combination, a spindle bracket having a spindle journaled therein, an electric drive motor having a drive shaft disposed in parallel spaced relation to said spindle, means supporting said motor and including resilient cushioning means between said motor and said bracket for substantially preventing the transmission of vibration from said motor to said bracket, an arm projecting from said means transversely across one end of said spindle and drive means connecting said motor to said spindle and including a resilient torque coupling supported in said arm in substantially coaxial relation to said spindle for substantially preventing the transmission of vibration from said motor to said spindle.

6. A rotary spindle drive comprising, in combination, a spindle bracket having a spindle journaled therein, a drive motor having a drive shaft parallel to said spindle and disposed in transversely offset relation to said bracket, resilient cushioning means between said motor and said bracket for supporting said motor and operable to absorb motor vibration and to prevent the transmission of said vibration to said bracket, a transversely extending arm rigidly secured to said motor, a sleeve journaled in said arm in substantially coaxial relation to said spindle, alined pulleys removably secured to said drive shaft and said sleeve, and a drive connection including a resilient torque coupling connecting said sleeve to said spindle and operable to prevent the transmission of vibration from said motor to said spindle.

WALTER COULSON.